US008880876B2

(12) United States Patent
Rahman et al.

(10) Patent No.: US 8,880,876 B2
(45) Date of Patent: *Nov. 4, 2014

(54) USE OF APPLICATION IDENTIFIER AND ENCRYPTED PASSWORD FOR APPLICATION SERVICE ACCESS

(71) Applicant: Cellco Partnership, Basking Ridge, NJ (US)

(72) Inventors: Iftekhar Rahman, Billerica, MA (US); Young Rak Choi, Belle Mead, NJ (US)

(73) Assignee: Cellco Parnership, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/100,705

(22) Filed: Dec. 9, 2013

(65) Prior Publication Data

US 2014/0095875 A1    Apr. 3, 2014

Related U.S. Application Data

(63) Continuation of application No. 13/361,536, filed on Jan. 30, 2012, now Pat. No. 8,607,043.

(51) Int. Cl.
H04L 29/06 (2006.01)
H04W 12/06 (2009.01)
H04L 9/32 (2006.01)

(52) U.S. Cl.
CPC ........... *H04L 63/0428* (2013.01); *H04W 12/06* (2013.01); *H04L 9/3297* (2013.01); *H04L 2209/80* (2013.01); *H04L 9/3226* (2013.01); *H04L 63/0807* (2013.01); *H04L 9/321* (2013.01)
USPC ............................... 713/155; 713/183; 726/5

(58) Field of Classification Search
USPC ....................................... 713/155, 183; 726/5
See application file for complete search history.

(56) References Cited

U.S. PATENT DOCUMENTS

| 5,661,807 | A | 8/1997 | Guski et al. |
| 7,665,127 | B1 | 2/2010 | Rao et al. |
| 8,607,043 | B2 | 12/2013 | Rahman et al. |
| 2005/0021976 | A1 | 1/2005 | Trossen |
| 2008/0041937 | A1 | 2/2008 | Vawter |
| 2008/0299989 | A1 | 12/2008 | King et al. |
| 2011/0173681 | A1 | 7/2011 | Qureshi et al. |
| 2011/0307942 | A1 | 12/2011 | Youssefmir et al. |
| 2012/0210415 | A1 | 8/2012 | Somani et al. |
| 2012/0303774 | A1 | 11/2012 | Wilson et al. |

OTHER PUBLICATIONS

Entire prosecution history of U.S. Appl. No. 13/361,536, filed Jan. 30, 2012, entitled "Use of Application Identifier and Encrypted Password for Application Service Access."

*Primary Examiner* — Michael Pyzocha

(57) ABSTRACT

To support authentication of a mobile device, an application server obtains an application identifier and password and creates an encrypted value by encrypting a combination of the password and a lime based value. The application server transmits the application identifier and encrypted value over a communication network to the mobile device as a credential, and the mobile device sends the credential over the network to a secure server providing an application assistance service. The secure server independently computes an encrypted value by encrypting the combination of the password and the time-based value. If the encrypted value front the received credential matches the encrypted value computed by the secure server, that server grants access to the assistance service for the mobile device.

19 Claims, 3 Drawing Sheets

USE OF APPLICATION IDENTIFIER AND ENCRYPTED PASSWORD FOR APPLICATION SERVICE ACCESS

CROSS REFERENCE TO RELATED APPLICATIONS

This application is a continuation of U.S. patent application. Ser. No. 13/361,536, filed Jan. 30, 2012, now U.S. Pat. No. 8,607,043, the content of which is incorporated herein by reference.

BACKGROUND INFORMATION

It is often necessary for mobile devices to provide authentication credentials to gain access to a secure server. For example, a mobile device may contain applications that require the assistance of secure servers, such as location-based service (LBS) applications, which require the services of location servers for locution determination. Such servers generally require mobile devices to provide authentication credentials before providing the requested assistance.

An authentication procedure could consist of the mobile device creating a credential by encrypting a password to send to the location server as the authentication credential. In such an arrangement, the mobile device would locally store the identifier and password and would encrypt the password before transmitting the encrypted value to the location server. Having the mobile device carry out the encryption may create the risk of revenue loss or security issues, as a hacker may be able to obtain the authentication credential, either from the mobile device itself or during transmission, and use a hacked credential to obtain free services or to disseminate sensitive location information.

Static or predictably changing encrypted values are also at risk from hackers, because they can be reverse-engineered to obtain the password. Because by definition a location server is stationary, a hacker can easily monitor the requests sent to it by a mobile device and use the information collected to reverse-engineer the authentication credential.

Hence, a need exists for improved technologies tor authenticating a mobile device.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. For instance, while one example uses a hash code as the encryption algorithm, other encryption algorithms may be used. Moreover, while the examples use a day as the units of time, other larger or smaller time periods may be implemented, as warranted by the circumstances. In at least some instances, well known methods, procedures, components, and/or circuitry have been described at a relatively high-level, without detail, in order to avoid unnecessarily obscuring aspects of the present teachings.

Figure 1:
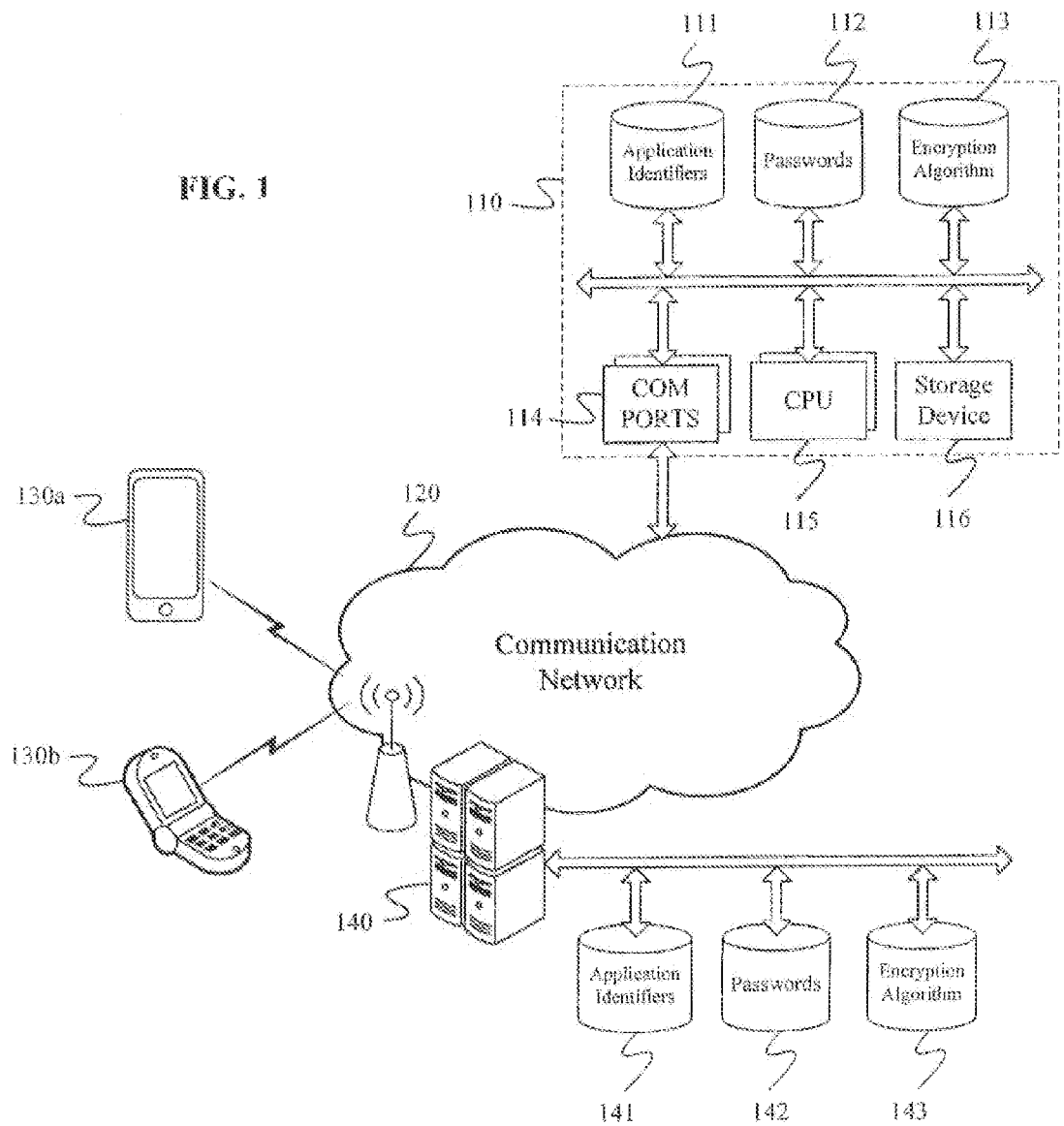
FIG. 1 is a simplified functional block diagram of a system offering a variety of services to mobile devices, and that may implement a procedure Tor authenticating a mobile device.

The various methods and systems described below relate to authenticating a mobile device. Reference now is made in detail to the examples illustrated in the accompanying drawings and discussed below. FIG. 1 illustrates a system that offers wireless mobile communications for mobile devices, as well as various application services that utilize the transport capabilities of the mobile network. For those services, such as location based services, which involve secure communications, the system also implements a procedure for authenticating, a mobile device.

The mobile device, such as a smart phone 130a, a portable handset 130b, a tablet computer, or other portable wireless communication device, receives an application identifier and encrypted value from an application server 110 over a wireless or mobile type communication network 120. When appropriate tor accessing a particular secure service, the mobile device transmits the application identifier and encrypted value to the secure server 140 as the authentication credential.

The application server 110 in our example is implemented by a general purpose computer system programmed or otherwise configured to act as a 'server' with respect to client applications running on the mobile devices 130a, 130b. Although shown as a single such system, there may be a number of application servers 110 at various locations, to handle high traffic volumes and/or to provide a level of redundancy in case of server failure or overload.

By way of a simple example, the application server 110 includes one or more communication interfaces or ports 114, one or more central processing units (CPUs) 115 controlling server operations including communications through the port(s) 114, and one or more storage devices 116 accessible lo the CPU(s) 115. The block diagram shows the elements 111-116 of the application server 110 that are linked for internal data communication purposes via a bus.

The communication ports 114 are coupled to the mobile communication network 120 to allow communications of the application server 110 with the mobile devices 130a, 130b via the network 120. The storage device(s) 116 store programs for execution by the CPU(s) 115 as well as data processed by the CPU(s) 115 during program execution For example, the storage device(s) 116 store one or more server application programs, which when executed by the CPU(S) 115, configure the application server 110 to perform the security/authentication related functions of such a server 110 as discussed herein. On the same storage device 116 or on separate storage devices, the server 110 also has a database or list of application identifiers 111 and a database or list of passwords 112. Programming and any related data used for encryption is stored as an encryption algorithm 113, in our example, again on the same storage device 116 or on separate storage devices.

In the example, the application identifiers 111, the passwords 112 and the programming/data for the encryption algorithm 113 are shown as being stored within the application server 110. However, some or all of the stored information 111-113 may be stored on peripheral or remote platforms, for example, for efficiency or security reasons and/or to allow sharing thereof by other server hardware platforms.

As outlined above, application server 110 includes a list of application identifiers 111 and a list of passwords 112, which are located in a computer readable storage device accessible to the CPU(s) of the application server 110. A computer readable storage device can be non-volatile memory, such as flash memory or optical or magnetic disks, or volatile memory, such as dynamic random-access memory (DRAM). The computer readable storage device can be a single device or a combination of multiple memory devices. The application identifiers can be stored separately from the passwords, as shown for convenience, or the application identifiers and passwords can be kept in the same storage device, depending on factors like capacities of the storage device(s), numbers and data volume of the identifiers and passwords, expected traffic load on the application server 110, requisite speed of access, etc.

The application server 110 includes a communication connection via port 114 to a communication network 120, for the communications with the mobile devices 130a, 130b. A mobile device can be any mobile device connected to a communication network and capable of running an application that requires access to a server requiring authentication, such as a smart-phone 130a, portable handset 130b, tablet computer, or other portable computer.

The CPU 115 has access to the list of application identifiers 111 and the list of passwords 112, the encryption algorithm 113, and an executable program in a computer readable storage device 116 to configure the computer system as the application server 110. Each CPU 115 may be formed of one or more processors. For purposes of this discussion, execution of the program by the processor(s) of the CPU(s) 115 configures the system 110 to perform the application sever functions for authenticating a mobile device 130a or 130b. Execution of the programming configures the CPU 115 to carry out steps for providing the authentication credential like those discussed below with respect to the process of FIG. 2.

The application server 110 is also configured to obtain an application identifier from the list of application identifiers 111 and a password from the list 112. The application server 110 is also configured to compute an encrypted value by carrying out the encryption algorithm on a combination of the password and a time-based value. The encryption algorithm can be any algorithm that will result in a value that maintains the secrecy of the password and time-based value used as inputs for the algorithm, such as a hash code. The time-based value can be computed on demand, or calculated once at the beginning of a time period and updated when the time increments to the next period. Other algorithms to generate and update the time-bused value may be used, for example, depending on the desired level of security and thus the desired frequency for obtaining an updated credential. The computer system is further configured to transmit the encrypted value and application identifier from the computer 115 through the communication network 120, as the requested credential, to the mobile device to allow the mobile device to provide the credential and application identifier to the secure server as the authentication credential.

In one embodiment, the encryption algorithm present at both the application and secure servers can change in m established manner over time, such that the same algorithm is not permanently used, but where the application and secure servers will still use identical algorithms concurrently.

The credential containing application identifier and encrypted value are transmitted to the mobile device so that it can transmit the credential to the secure server 140, to allow the secure server 110 to authenticate the mobile device to access or utilize the secure application assistance service offered by the secure server 140. The application assistance service provided by the secure server 140 can be any service where the data or additional computing power of a server can be used to assist the mobile device, such as the location-based application assistance services described in FIG. 3, below.

The secure server 140 has access to a computer readable storage device with copies of the application identifiers 141 and password 143 and also has access to an encryption algorithm 143 that is the same as the encryption algorithm 113 of the computer system, to allow the secure server to independently compute the encrypted value provided by the mobile device from the password.

The hardware of the server 140 may be similar to that of the server 110 discussed above, although in the example shown in FIG. 1, several of the devices storing the information used by the server 140 are represented by external (peripheral or remote) storage devices. The secure server 140 in our example is implemented by a general purpose computer system programmed or otherwise configured to act as a 'server' with respect to client applications running on the mobile devices 130a, 130b. The secure server is connected to the mobile communication network 120 to allow communications of the secure server 140 with the mobile devices 130a, 130b via the network 120. Although shown as a single such system, there may be a number of secure servers 140 at various locations, to handle high traffic volumes and or to provide a level of redundancy in case pi server or network troubles.

Figure 2:
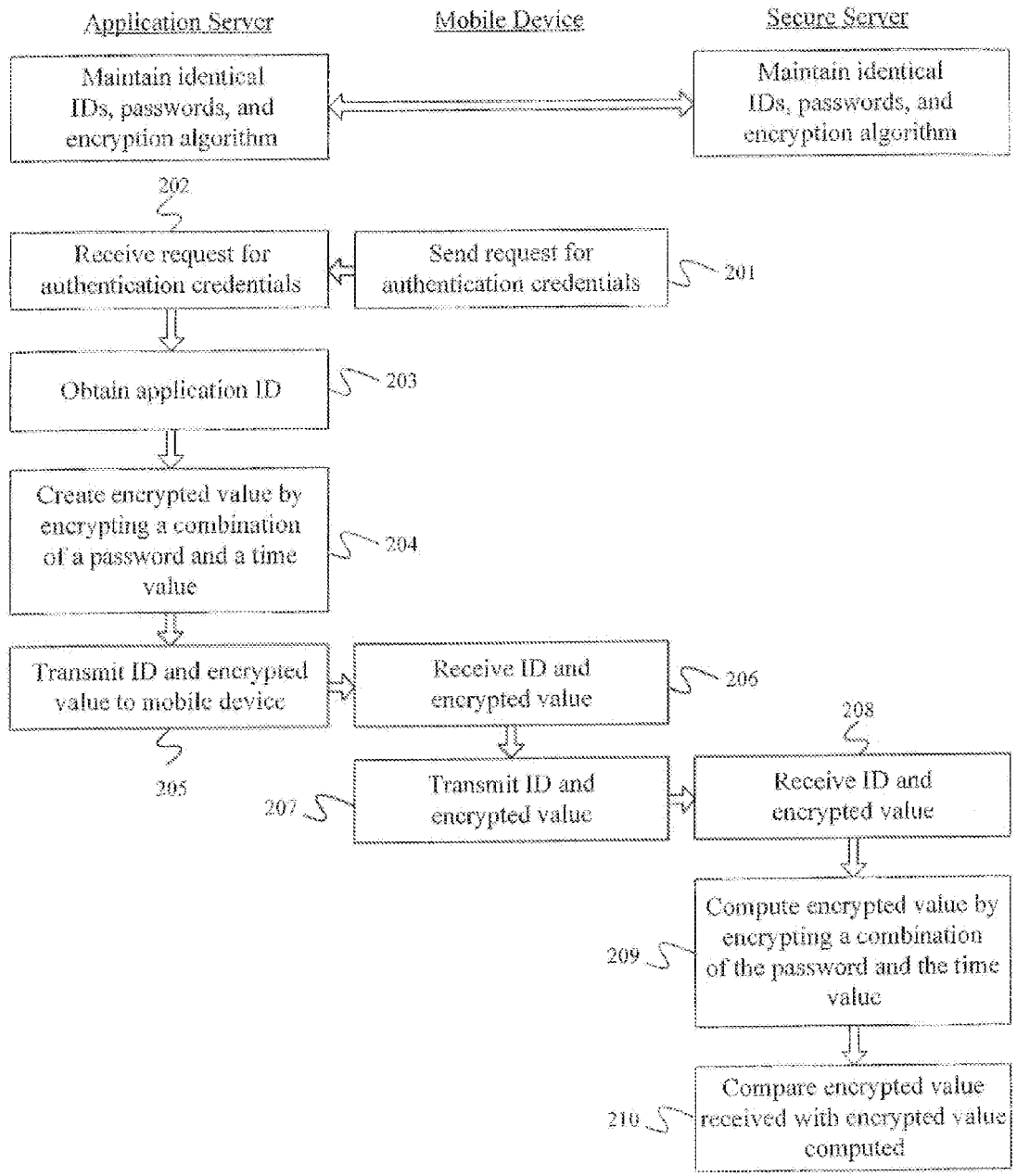
FIG. 2 is a flow chart of an exemplary method of authenticating a mobile device.

FIG. 2 illustrates an exemplary method to authenticate a mobile device. The application server receives a request over a communication network for an authentication credential tor a mobile device to access a secure server (step 202). While FIG. 2 shows the request being sent by the mobile device (step 201), the request may also be sent by the secure server itself as a request to authenticate the mobile device attempting to gain access. After receiving the request for authentication (step 202), the application server obtains an application identifier (step 203) and creates an encrypted value by encrypting a combination of a password and a time-based value (step 204). The application identifier corresponds to the application on the mobile device. The password can be a single password used for the application on any mobile device or can be one of multiple passwords that vary based on, for example, the type of mobile device (e.g., smartphone vs. portable handset) or the user of the mobile device making the request (e.g., a different password for each user). The application server transmits the application identifier and encrypted value as the credential to the mobile device (step 205), which receives it (step 206).

When the mobile device wishes to utilize the secure server for an application, it sends the credential to the secure server (step 207), which receives it (step 208). The secure server independently computes the encrypted value by encrypting the combination of the password and the time-based value (step 209). The method is carried out such that the identifier, password, and encryption algorithm used by the application server implementing the authentication method are identical to those same items located on the secure server requiring authentication, so that when the secure server independently computes the encrypted value from the password, it will create the same encrypted value created by the application server. The secure server compares the encrypted value it receives from the mobile device with the encrypted value it independently computed (step 210), and grants access to the mobile device if the two encrypted values match.

The time used by the application and secure servers is maintained in common units, such as a time period that increments daily. The word time is not limited here to its colloquial usage ("time of day"), but is meant to encompass any value that increases into the future, such as year, month, week, day, hour, or minute. Because time is kept independently by both servers, the time-baaed value need not be transmitted so long as the servers maintain the time for the time-baaed value in the same units. If desired, the time can be kept synchronized between the application server and secure server by using a common clock signal, such as the time signal provided, for example, by the global positioning system or a cellular telephone network. In another embodiment, the time used by the application server to create the time-based value can be transmitted as part of the credential so that when the credential is received by the location server can use the time used by the application server to re-create the time-based value created by the application server. In still another embodiment, the time used by both the application and secure servers is modified by a value (i.e., time shifted) before being used to create the time-based value. The time shift can be a set amount known to both the application and secure servers. The time shift tan also be a pseudo-random number generated by a pseudo-random number generating algorithm present on both servers.

While FIG. 2 displays the steps in a particular order, they need not be carried out in the order shown. For example, the application server can create an encrypted value before receiving a request for an authentication credential, and the secure server can compute the encrypted value before receiving the encrypted value from the mobile device.

Figure 3:
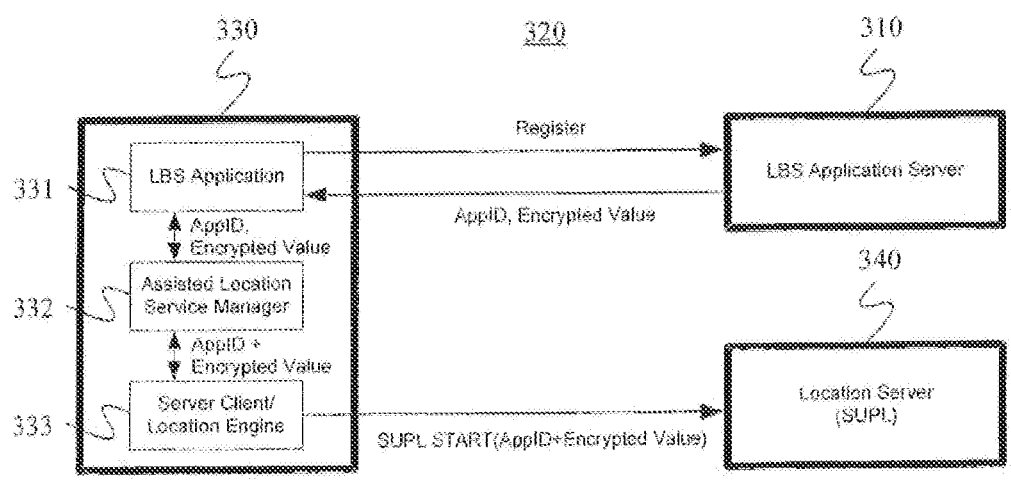
FIG. 3 is a flow chart of an exemplary method of authenticating a mobile device, to allow a location-based service application to access a location server.

FIG. 3 illustrates an exemplary method where the application is a location-based service application, the application server is a location-based services (LBS) application server, and the secure server providing the application assistance service is a location server providing location-based services, such as location determination. As illustrated by way of example in FIG. 3, a mobile device 330 communicates with an application server 310, in this example, an LBS application server 310 corresponding to the application server 110 of FIG. 1, over a communication network 320 in order to obtain an authentication credential for the mobile device to utilize a location assistance service from the location server 340, which corresponds to the secure server 140 of FIG. 1. In addition to transmitting the credential, the LBS application server 310 can provide other assistance to the mobile device, such as transmitting mapping information and media files to be used by the application. Location server 340 may be based on the OMA standards, which include Secure User Plane Location (SUPL) and User Plane Location Protocol (ULP), or may be based on other standards such as CDG or 3GPP2. Location-based application assistance services based on these standards are generally referred to as assisted location services, of which an assisted global positioning system (GPS) location service may play a role. The mobile device 330 contains an LBS application 331, which registers with its LBS application server 310 on a periodic basis, such as once per day. As part of the registration, the LBS application 331 requests an application identifier ('AppID') and a password. Instead of transmitting the password that the location server requires for authentication, the LBS application server 310 creates an encrypted value which can be derived from the same password on the location server. In certain embodiments, the mobile device never obtains (or stores or transmits) the password or the encryption algorithms to create the encrypted value and thus a hacker in possession of an authenticated mobile device is unable to reverse engineer the encrypted value to obtain the password.

To create the encrypted value, the LBS application server combines the password with a time-based value and carries out an encryption algorithm, such as a SHA1 or SHA2 hash function, on the combination.

The time-based value may be determined using the current time when the encryption is earned out, such as the dale. The time-based value may not be based on the date or any standard time-keeping system (e.g., wall-clock time), it may be any function that changes based on time as long as both functions are known by both servers. For instance, the units of time could be a larger time period such as a week, or a smaller time period such as an hour. The choice of which time period to use may be determined based on the preferred duration of the use by the mobile device, as the credential automatically becomes out of date when the time changes to the next period. A longer time period may be preferable, for example, for a location-based navigation application so that the credential does not become out-of-date in the middle of a long-distance trip, while a shorter time period may be preferable, for example, for applications that handle payment, which are more likely to be used infrequently tor short periods of time, and also benefit from the higher level of security obtainable by more frequently changing credentials In one embodiment, the time period of the time used to create the time-based value can change in an established manner over time, such that the same time period is not permanently used, but where the application and secure servers will still use the same time period concurrently.

Location-based servers are more susceptible to hacking attempts because they constitute a fixed target. A simple linearly-increasing time-based encryption mechanism may create a set of encrypted values that can be monitored and used as data points tor a stationary hacker to reverse-engineer the encryption mechanism and calculate the password. Thus, the time-based value adds randomness to the resulting encrypted value while still being derived from the time. One mechanism to do this is to add a pseudo-random number generated by a pseudo-random number generating algorithm to a value representing the current time to obtain the time-based value. In another example, the time-based value itself could be computed using a pseudo-random number generating algorithm that takes a value corresponding to the current time as an input. In either case, the pseudo-random number generating algorithm is used in the application server and in the location server. By using a pseudo-random number generating algorithm, the time-based value is less predictable, and still changes over time.

Once the encrypted value is computed, the LBS application server 310 passes the application ID and the encrypted value to the LBS application 331 of the mobile device 130.

When the LBS application 331 intends to access the location server 340, it uses the assisted location service manager 332 and the server client/location engine 333 of the mobile device. The LBS application provides the application identifier and encrypted value to the assisted location service manager 332, which concatenates them together into a character siring with a plus character This concatenated character string is passed by the assisted location service manager to the server client/location engine 333. The server client location engine then starts a SUPL session with the location server, and sends the concatenated character suing in a message in the SUPL START format. While, in this example, the assisted location service manager concatenates the application identifier and encrypted value together with a plus character, the application identifier and encrypted value can be combined in other ways, or can be kept and transmitted separately, so long as the location server is able to determine the application identifier and encrypted value from the message it receives from the mobile device.

When the location server 340 receives the SUPL START message, it extracts the application identifier and encrypted value using the plus character in the string. The location server 340 then checks the application identifier against a database of application identifiers. If there is a match, then the location server 340 takes the corresponding password in the database and computes the encrypted value using the same method described earlier for the LBS application server 310.

Depending on the amount of time elapsed since the encrypted value was first computed by the LBS application server 310, the time-based value used when the encrypted value was created may or may not have changed. If the time-based value has changed, then the encrypted value computed by the location server 340 will not match the encrypted value provided by the mobile device 330. The location server 340 can use this result as an automatic mechanism tor revoking credentials alter a certain period time has expired. If desired, however, the location server 340 can be designed to compute two different encrypted values, one with current time-based value and one with the previous time-based value. Consequently, the location server 340 can account for encrypted values that were calculated near the end of the previous time period that otherwise would have expired after only a short while. The location server 340 may also calculate the encrypted values tor a certain number of the previous periods, in order to allow credentials to last for a certain number of periods without having to alter the units of time used for the time-based value. For example, if the unit of time is one day but the location server 340 wishes to allow credentials to last for four days, then the location server 340 can calculate encrypted values using the current and three previous time-based values.

As shown by the above discussion, the functions relating to the application server configured to provide credentials to mobile devices and the secure assistance server configured to authenticate applications on mobile devices based on the credentials may be implemented on computers or processor based systems or in communication with a mobile communication network. Although specially built platforms could be used, each instance of the equipment typically will take the form of a general-purpose computer or the like programmed to implement the respective server functions discussed above.

A general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities of the servers involve programming, including executable code as well as associated stored data, e.g. the information about application identifiers, passwords and encryption algorithms. The respective software code is executable by the general-purpose computer or the like that functions as the application server or the secure assistance server. In operation, the code is stored within the particular programmable platform. At other times, however, the software may be stored at other locations and or transported for loading into the appropriate system hardware. Execution of such code by a processor of the platform enables the platform to implement the respective server functions, in this case, including respective functions relating to processing of credentials, in essentially the manner performed in the implementations discussed and illustrated herein.

Similarly, the functions relating to the handling of the credential in the mobile device may be implemented by appropriate software or firmware programming for execution by a processor of the mobile device. A mobile device may include a wireless transceiver for communication via the mobile network various user interface elements, a processor and a storage device such as a Hash memory or the like. For location related functions the mobile device may also include a GPS receiver. In addition to data for use by the processor and other elements of the device, the storage device stores programming executed by the processor, to configure the mobile device to perform various functions, including the functions to the handling of the credential in the mobile device. In operation, the programming code is stored within the particular mobile device. At other times, however, the software or firmware programming may be stored at other locations and/or transported for loading into the mobile device, for example, for downloading of a client application from an application server or the like.

Broadly, terms such as computer or machine readable medium refer to any storage or communication medium that participates in providing instructions for execution by a processor of a platform configured as a server or of a mobile device, unless restricted to a tangible or non-transitory type medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise staled all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments tor the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising an application server computer, the application server computer comprising:
    a network communication interface;
    a processor;
    a storage device; and
    programming in the storage device for the processor, wherein execution of the programming by the processor configures the computer as the application server to perform functions, including functions to:
    receive a first request from a mobile device via a mobile communication network, for a credential for use by a client application on the mobile device to request the assistance of a secure server of the mobile communication network providing an application assistance service;
    in response to the first request, obtain an identifier identifying the application on the mobile device, and a password;
    combine the password and a time-based value together to obtain a combined value;
    encrypt the combined value in accordance with an algorithm to obtain an encrypted value; and
    transmit the application identifier and the encrypted value as the requested credential, through the mobile communication network to the mobile device for accessing the application assistance service via the secure server.

2. The system of claim 1, wherein the time-based value is computed by entering a value corresponding to the current time into a pseudo-random number generating algorithm.

3. The system of claim 1, wherein the time-based value is computed by adding a value generated by a pseudo-random number generating algorithm to a value corresponding to the current time.

4. The system of claim 1, further comprising a computer configured as the secure server, the secure server computer comprising:
    a network communication interface;
    a processor;
    a storage device; and
    programming in the storage device for the processor of the secure server computer, wherein execution of the programming by the processor of the secure server computer configures the secure server computer to perform functions, including functions to:
    receive a second request for the application assistance service from the client application executing on the mobile device, the second request including the requested credential;
    upon validation of the application identifier in the second request received by the secure server computer:
        (a) obtain the password;
        (b) combine the password and a time-based value together, to obtain a combined value; and
        (c) encrypt the combined value obtain by the secure server computer in accordance with the algorithm, to obtain another encrypted value; and
    based upon a match of the other encrypted value and the encrypted value included in the received requested credential, initiate a session through the mobile communication network for the secure server to provide requested assistance to the client application executing on the mobile device.

5. The system of claim 4, wherein:
    the client application is a location-based-service (LBS); and
    the application server is a LBS application server.

6. The system of claim 4, wherein the requested credential further comprises a value corresponding to the time used by the application server to create the time-based value.

7. The system of claim 6, wherein the functions of the secure server further comprise a function to re-create the time-based value based on the value corresponding to the time used by the application server to create the time-based value.

8. A mobile device, comprising:
    a wireless transceiver configured to provide communication via a mobile communication network;
    one or more user interface elements;
    a processor;
    a memory; and
    programming, including a client application, in the memory,
    wherein execution of the programming by the processor configures the mobile device to perform functions, including functions to:
    send a first request, via the mobile communication network directed to an application server, for a credential for use by the client application to request the assistance of a secure server of the mobile communication network providing an application assistance service;
    receive, via the mobile communication network, a response from the application server including the credential, comprising an identifier obtained by the application server and identifying the client application, and an encrypted value, the encrypted value having been encrypted from a combination of a password and a time-based value; and
    upon execution of the client application on the mobile device, send a second request, for an application assistance service to a secure server, containing the received credential for authentication of the request.

9. The mobile device of claim 8, wherein the time-based value is a value having been computed by entering a value corresponding to the current time into a pseudo-random number generating algorithm.

10. The mobile device of claim 8, wherein the time-based value is a value having been computed by adding a value generated by a pseudo-random number generating algorithm to a value corresponding to the current time.

11. The mobile device of claim 8, wherein:
    the client application is a location-based-service (LBS); and
    the secure server is a secure location server connected to the mobile communication network, for providing location assistance.

12. The mobile device of claim 8, wherein the received credential further comprises a value corresponding to the time used by the application server to create the time-based value.

13. A computer, comprising:
- a network communication interlace configured to provide communications through a mobile communication network;
- a processor;
- a storage device; and
- programming in the storage device tor the processor, wherein execution of the programming by the processor configures the computer as a secure server of the mobile communication network to perform functions, including functions to:
- receive a request tor an application assistance service from a client application executing on a mobile device, the request including a credential comprising an identifier identifying the client application on the mobile device and a first encrypted value generated by an application server, the encrypted value having been encrypted from a combination of a password and a time-based value;
- upon validation of the application identifier in the request:
  - (a) obtain a password;
  - (b) combine the password and a time-based value together, to obtain a combined value;
  - (c) encrypt the combined value in accordance with an algorithm to obtain a second encrypted value;
- compare the first encrypted value to the second encrypted value; and
- when the second encrypted value matches the first encrypted value, initiate a session through the mobile communication network for the secure server to provide requested assistance to the client application executing on the mobile device.

14. The computer of claim 13, wherein each time-based value is a value having been computed by entering a value corresponding to a current time into a pseudo-random number generating algorithm.

15. The computer of claim 13, wherein each time-based value is a value having been computed by adding a value generated by a pseudo-random number generating algorithm to a value corresponding to a current time.

16. The computer of claim 13, wherein the functions further comprise functions to:
- when the second encrypted value does not match the first encrypted value, combine the password together with a time-based value for a time period immediately preceding the current time period, to obtain a second combined value;
- encrypt the second combined value in accordance with an algorithm to obtain a third encrypted value; and
- based upon a match of the third encrypted value to the first encrypted value, initiate a session through the mobile communication network tor the secure server to provide requested assistance to the client application executing on the mobile device.

17. The computer of claim 13, wherein:
- the client application is a location-based-service (LBS) application;
- the secure server is a secure location server connected to the mobile communication network, for providing locution assistance; and
- the functions (a) to (c) performed upon validation of the application identifier of the LBS application in the second request are performed by the secure location server.

18. The computer of claim 13, wherein the credential further comprises a value corresponding to the time used by the application server to create the time-based value.

19. The computer of claim 18, functions further comprise a function to re-create the time-based value based on the value corresponding to the time used by the application server to create the time-based value.

* * * * *